(12) United States Patent
Su

(10) Patent No.: US 8,552,883 B1
(45) Date of Patent: Oct. 8, 2013

(54) ELECTRONIC THREE-DIMENSIONAL SURFACE DEVICE

(76) Inventor: George C. Su, Hayward, CA (US)

( * ) Notice: Subject to any disclaimer, the term of this patent is extended or adjusted under 35 U.S.C. 154(b) by 822 days.

(21) Appl. No.: 12/700,679

(22) Filed: Feb. 4, 2010

(51) Int. Cl.
*G09G 3/34* (2006.01)

(52) U.S. Cl.
USPC .................................... 340/815.4; 345/108

(58) Field of Classification Search
None
See application file for complete search history.

(56) References Cited

U.S. PATENT DOCUMENTS

| | | | |
|---|---|---|---|
| 3,604,780 A | 9/1971 | Martin | |
| D264,632 S | 5/1982 | Tiffany | |
| 4,412,799 A | 11/1983 | Gates | |
| 4,525,711 A | 6/1985 | Gery | |
| D347,003 S | 5/1994 | Fox | |
| 5,717,423 A * | 2/1998 | Parker | 345/108 |
| 5,793,918 A * | 8/1998 | Hogan | 385/116 |
| 5,801,666 A | 9/1998 | MacFarlane | |
| 6,189,246 B1 * | 2/2001 | Gorthala | 40/446 |
| 6,195,016 B1 | 2/2001 | Shankle et al. | |
| 6,462,840 B1 * | 10/2002 | Kravtsov | 358/474 |
| 6,625,088 B1 | 9/2003 | Mah et al. | |
| 7,009,595 B2 * | 3/2006 | Roberts et al. | 345/156 |
| 7,277,080 B2 * | 10/2007 | Goulthorpe | 345/108 |
| 7,602,351 B1 * | 10/2009 | Amidon | 345/6 |
| 2001/0025940 A1 * | 10/2001 | Kumar | 251/129.16 |
| 2005/0151761 A1 * | 7/2005 | Hillis et al. | 345/905 |
| 2006/0044256 A1 * | 3/2006 | Carlberg | 345/108 |

* cited by examiner

*Primary Examiner* — Brian Zimmerman
*Assistant Examiner* — Kevin Lau

(57) ABSTRACT

An electronic three-dimensional (3D) surface device for creating tactile physical 3D images featuring hydraulic cylinders disposed in a base; fiber optic rods slidably disposed in each hydraulic cylinder which utilize a hydraulic mechanism to move the fiber optic rod upwardly and downwardly, the fiber optic rod comprises a colored light source; a microprocessor operatively connected to the hydraulic cylinders and colored light sources; and a device independent bitmap (DIB) file format and a computer software system configured to read the DIB file format, the DIB file format represents a tactile physical 3D image; wherein the microprocessor is configured to receive input signals from the computer software system based on the DIB file format, wherein the microprocessor sends output commands to hydraulic cylinders and colored light sources to modify height and color of the respective fiber optic rods based on the DIB file format to create the tactile physical 3D image.

9 Claims, 4 Drawing Sheets

ELECTRONIC THREE-DIMENSIONAL SURFACE DEVICE

FIELD OF THE INVENTION

The present invention is directed to visual display systems, more particularly to an electronic device that can create three-dimensional structures.

BACKGROUND OF THE INVENTION

Systems for creating physical tactile three-dimensional images (e.g., structures) are very limited. The present invention features a novel electronic three-dimensional (3D) surface device for creating physical tactile 3D images. The device of the present invention utilizes voxels (e.g., fiber optic rods) controlled by hydraulic cylinders and colored light systems to create the 3D image or structure.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY

The present invention features an electronic three-dimensional (3D) surface device comprising a base having an open top and an inner cavity; a plurality of hydraulic cylinders disposed in the inner cavity of the base; fiber optic rods slidably disposed in each hydraulic cylinder in the base, the hydraulic cylinders utilize a hydraulic mechanism to move the respective fiber optic rod upwardly and downwardly in the hydraulic cylinder, wherein the fiber optic rod comprises a colored light source for adjusting color of the fiber optic rod; a microprocessor operatively connected to each hydraulic cylinder and each colored light source; and a device independent bitmap (DIB) file format and a computer software system configured to read the DIB file format, the DIB file format represents a tactile physical 3D image, the computer software system is operatively connected to the microprocessor; wherein the microprocessor is configured to receive input signals from the computer software system based on the DIB file format, wherein upon receipt of the input signals from the computer software system the microprocessor sends output commands to corresponding hydraulic cylinders and corresponding colored light sources so as to modify height and color of the respective fiber optic rods based on the DIB file format to create the tactile physical 3D image.

In some embodiments, the hydraulic mechanism comprises hydraulic fluid pressure. In some embodiments, the hydraulic mechanism is controlled via a micro-valve. In some embodiments, the micro-valve is solenoid-actuated. In some embodiments, the colored light source is a light emitting diode (LED) mechanism, the colored light source is a liquid crystal display (LCD) mechanism, a organic light emitting diode (OLED) mechanism, a digital light processing (DLP) mechanism, the like, or a combination thereof. In some embodiments, the tactile physical 3D image is a topographical map.

DESCRIPTION OF PREFERRED EMBODIMENTS

Referring now to FIG. 1-6, the present invention features an electronic three-dimensional (3D) surface device 100. The device 100 of the present invention can create tangible topographical three-dimensional (3D) displays for flat surfaces (e.g., a desktop) or wall surfaces. The 3D display is a physical tactile 3D image as opposed to an intangible image, for example stereoptics or holograms.

Figure 1:
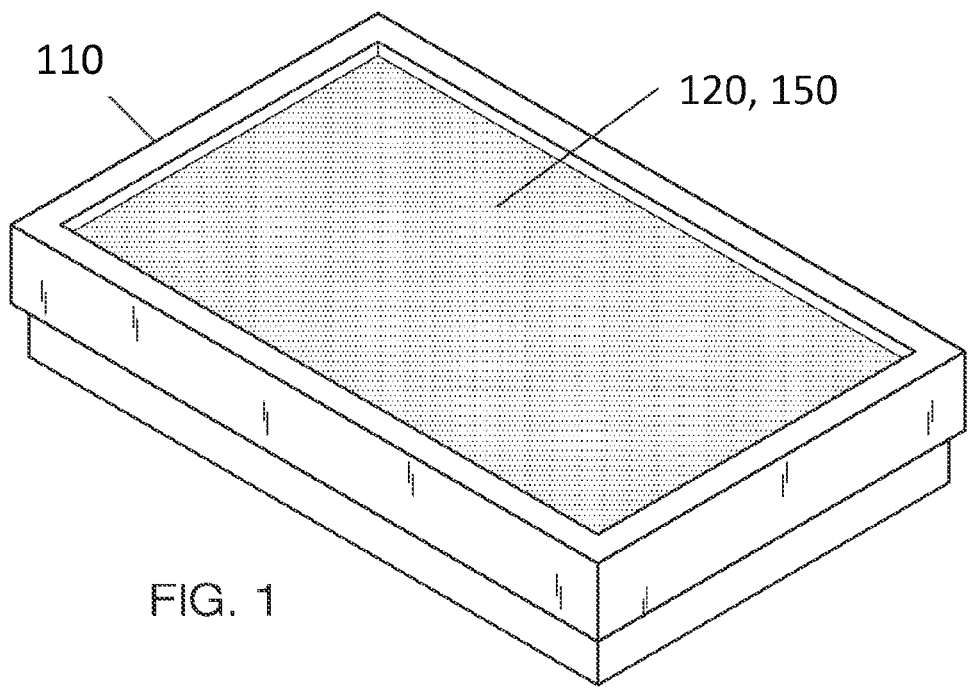
FIG. 1 is a perspective view of the electronic three-dimensional (3D) surface device of the present invention.
Figure 2:
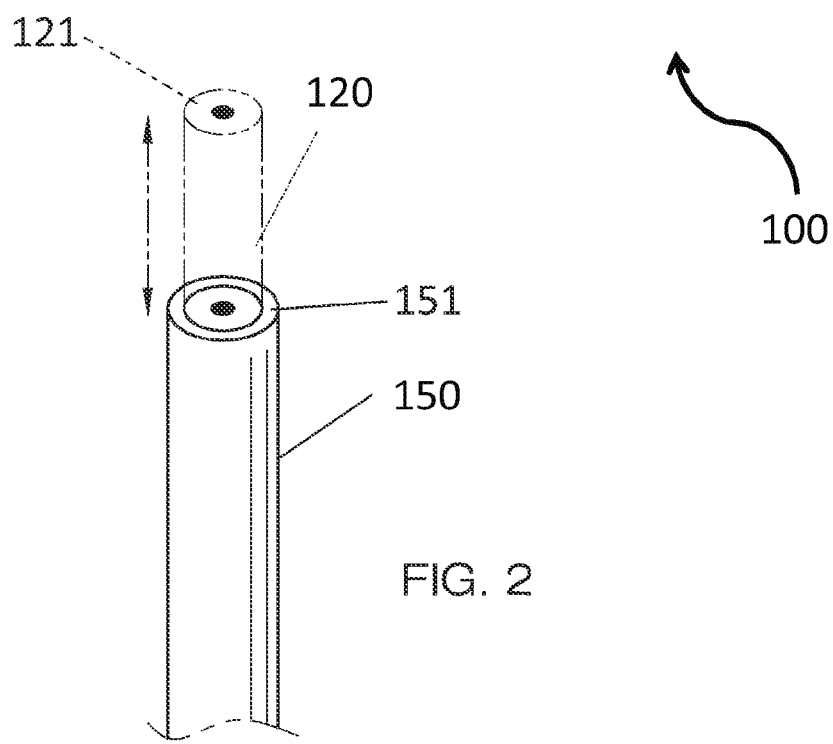
FIG. 2 is an exploded view of a hydraulic cylinder and fiber optic rod of the device of FIG. 1.
Figure 3:
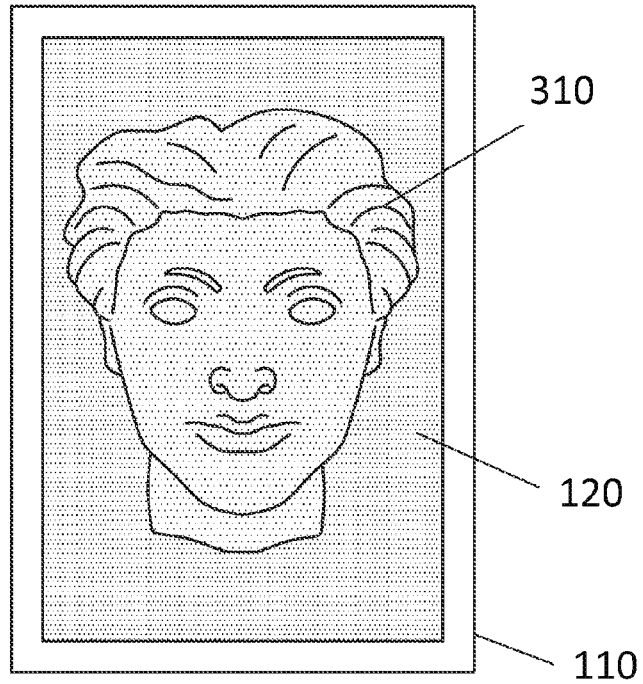
FIG. 3 is a front view of the electronic three-dimensional (3D) surface device of FIG. 1 showing a 3D image of a face.
Figure 4:
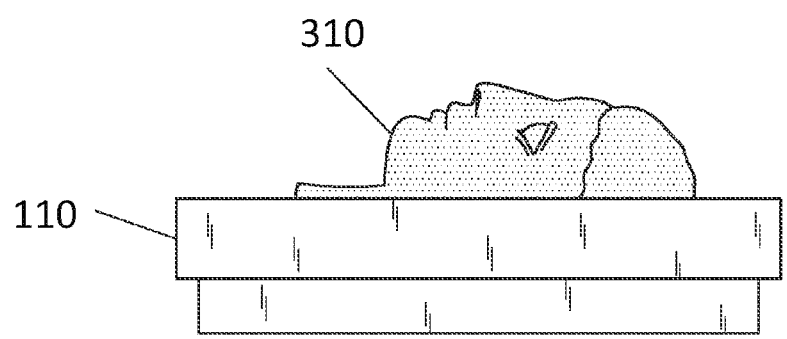
FIG. 4 is a side view of the electronic 3D surface device of FIG. 3.
Figure 5:
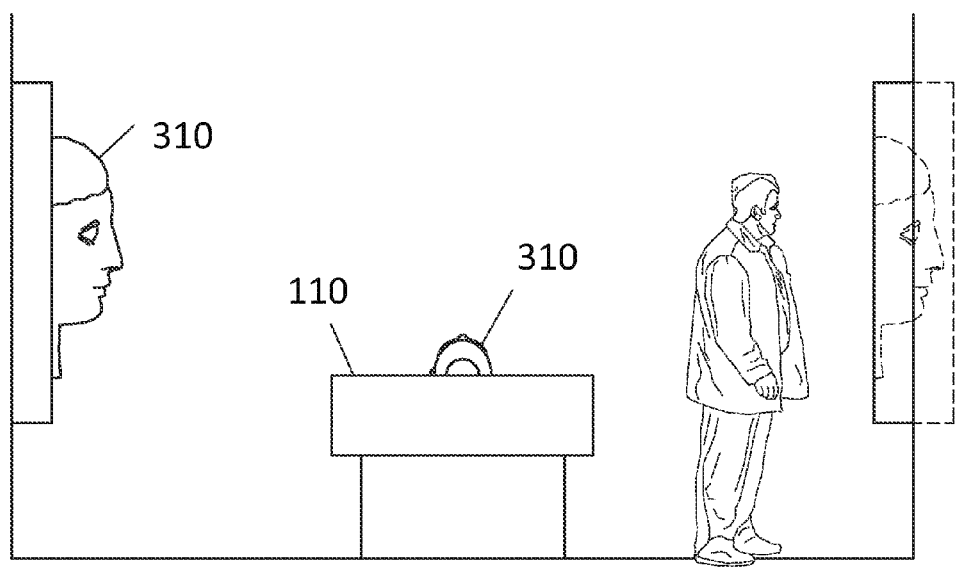
FIG. 5 is a schematic representation of a 3D image modeled after an individual's face.

Referring now to FIG. 1 and FIG. 2, the device 100 of the present invention comprises a base 110 having a bottom surface, outer edges (e.g., one side edge, two side edges, three side edges, four side edges, etc.). The top of the base 110 is open, and a plurality of fiber optic rods 120 (representing voxels) is disposed in the inner cavity of the base. Voxels are well known to one of ordinary skill in the art. For example, a voxel is an element of volume, which represents a value on a 3D space. Each fiber optic rod 120 (e.g., voxel) is adjustable in height (e.g., the fiber optic rods 120 can each move upwardly and downwardly within their place in the base 110). Each fiber optic rod 120 is adjustable in color as well. The movement of various fiber optic rods 120 to various heights provides a physical tactile topographic 3D image 310. FIG. 3 and FIG. 4 show an example of a physical tactile 3D image 310 created by the fiber optic rods 120.

Each fiber optic rod 120 comprises a first end 121 and is encased in a hydraulic cylinder 150 which also comprises a first end 151 (see FIG. 2). Each fiber optic rod 120 can each move upwardly and downwardly inside the hydraulic cylinder 150. The hydraulic cylinder uses a hydraulic mechanism to manipulate the height of the fiber optic rod 120 (e.g., voxel). For example, hydraulic fluid pressure may be used to provide the means of height adjustment. In some embodiments, the hydraulic fluid flow may be controlled via a micro-valve (e.g., solenoid-actuated, electronically controlled in response to a z-axis signal). In some embodiments, the height of the fiber optic rods 120 may be manipulated via an alternative mechanism (e.g., a pneumatic mechanism, an electrostatic mechanism, etc.).

In some embodiments, the color of the fiber optic rod 120 is manipulated via an LED lighting mechanism. In some embodiments, each fiber optic rod 120 (e.g., voxel) is operatively connected to a colored light source. The colored light source may be operatively connected to one or more microprocessors, wherein the colored light source responds to a signal or signals from the microprocessor(s) to provide a means of color control. In some embodiments, the color of the fiber optic rod 120 may be manipulated by alternate lighting means such as light emitting diodes (LED), liquid crystal display (LCD), organic light emitting diodes (OLED) digital light processing (DLP), the like, or a combination thereof. In some embodiments, color can be projected onto the fiber optic rods 120 (e.g., voxels) by some type of light source. The light source could be built into the base 110, or projected from an external source.

The device 100 of the present invention further comprises a microprocessor operatively connected to each fiber optic rod 120, for example to the colored light source and to the hydraulic cylinder. The microprocessor is operatively connected to a control system. The microprocessor is configured to receive signals form the control system and send output signals to the fiber optic rods 120 to manipulate the height and/or the color of the fiber optic rod. Certain patterns of signals to the microprocessor can generate certain 3D images.

Figure 6:
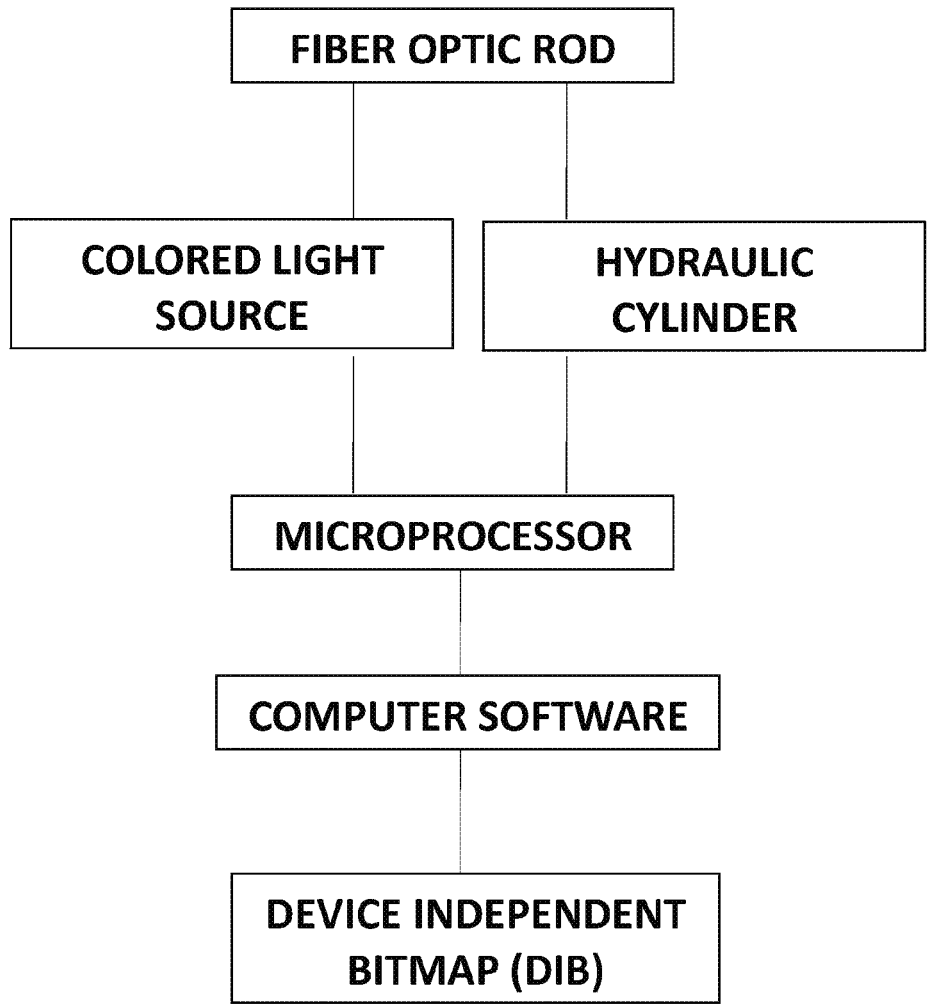
FIG. 6 is a schematic representation of the electrical and software components of the device of the present invention.

In some embodiments, the control of height and color for each fiber optic rod 120 can be specified using any common Device Independent Bitmap (DIB) file format with extensions to the format to carry height per pixel as well as the traditional image information. DIB file formats are well known to one of ordinary skill in the art. Computer software, or other electronic and/or mechanical processes, are configured to read the DIB file and send proper signals to the microprocessor (or microprocessors) operatively connected to the fiber optic rods 120. This computer software can also send signals from the DIB to the microprocessor for the control of the color of the fiber optic rods 120. In some embodiments, a single control signal could contain information to manipulate both color and height of the fiber optic rods 120 (e.g., voxels). In some embodiments, height and color information could be split and sent to independent control devices for color and height. Some embodiments will allow timed synchronization of the color and height signals to allow movement of the three-dimensional surface. FIG. 6 shows a schematic representation of the electrical and software components of the device 100 of the present invention.

In some embodiments, the device 100 of the present invention is used to provide topographical maps. The device 100 may provide interactive displays. The device 100 of the present invention may be advantageous for those individuals suffering with conditions such as visual impairment.

The device 100 of the present invention may be constructed from a variety of sizes. For example, the device 100 may be constructed in a small size (e.g., a small hand-held devices) or in a large size (e.g., a large display system). In some embodiments, the device 100 comprises a plurality of control switches.

The following the disclosures of the following U.S. Patents are incorporated in their entirety by reference herein: U.S. Pat. No. 4,525,711; U.S. Pat. No. 5,801,666; U.S. Pat. No. 6,195,016; U.S. Pat. No. 4,412,799; U.S. Pat. No. 3,604,780; U.S. Pat. No. 6,625,088.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. An electronic three-dimensional (3D) surface device comprising:
   (a) a base having an open top and an inner cavity;
   (b) a plurality of hydraulic cylinders disposed in the inner cavity of the base, wherein the hydraulic cylinder comprises a first end with an opening that opens into a cavity of the hydraulic cylinder;
   (c) fiber optic rods, each rod having a first lit end, the fiber optic rods slidably disposed in each hydraulic cylinder in the base, the hydraulic cylinders utilize a hydraulic mechanism to move the respective fiber optic rod upwardly and downwardly inside the hydraulic cylinder, wherein the fiber optic rod comprises a colored light source for adjusting color of the fiber optic rod, each of the first lit ends of the fiber optic rods moves away from and towards the first end of the hydraulic cylinder as each of the fiber optic rods slides in the hydraulic cylinder, wherein the first lit end of the fiber optic rod is enveloped by the first end of the hydraulic cylinder when in a completely collapsed position;
   (d) a microprocessor operatively connected to each hydraulic cylinder and each colored light source; and
   (e) a device independent bitmap (DIB) file format and a computer software system configured to read the DIB file format, the DIB file format represents a tactile physical 3D image, the computer software system is operatively connected to the microprocessor;
   wherein the microprocessor is configured to receive input signals from the computer software system based on the DIB file format, wherein upon receipt of the input signals from the computer software system the microprocessor sends output commands to corresponding hydraulic cylinders and corresponding colored light sources so as to modify height and color of the respective fiber optic rods based on the DIB file format to create the tactile physical 3D image.

2. The device of claim 1, wherein the hydraulic mechanism comprises hydraulic fluid pressure.

3. The device of claim 1, wherein the hydraulic mechanism is controlled via a micro-valve.

4. The device of claim 3, wherein the micro-valve is solenoid-actuated.

5. The device of claim 1, wherein the colored light source is a light emitting diode (LED) mechanism.

6. The device of claim 1, wherein the colored light source is a liquid crystal display (LCD) mechanism.

7. The device of claim 1, wherein the colored light source is an organic light emitting diode (OLED) mechanism.

8. The device of claim 1, wherein the colored light source is a digital light processing (DLP) mechanism.

9. The device of claim 1, wherein the tactile physical 3D image is a topographical map.

* * * * *